Aug. 27, 1940.  M. ISAACSON  2,212,541
SHOCK ABSORBER
Filed Jan. 4, 1939    3 Sheets-Sheet 1
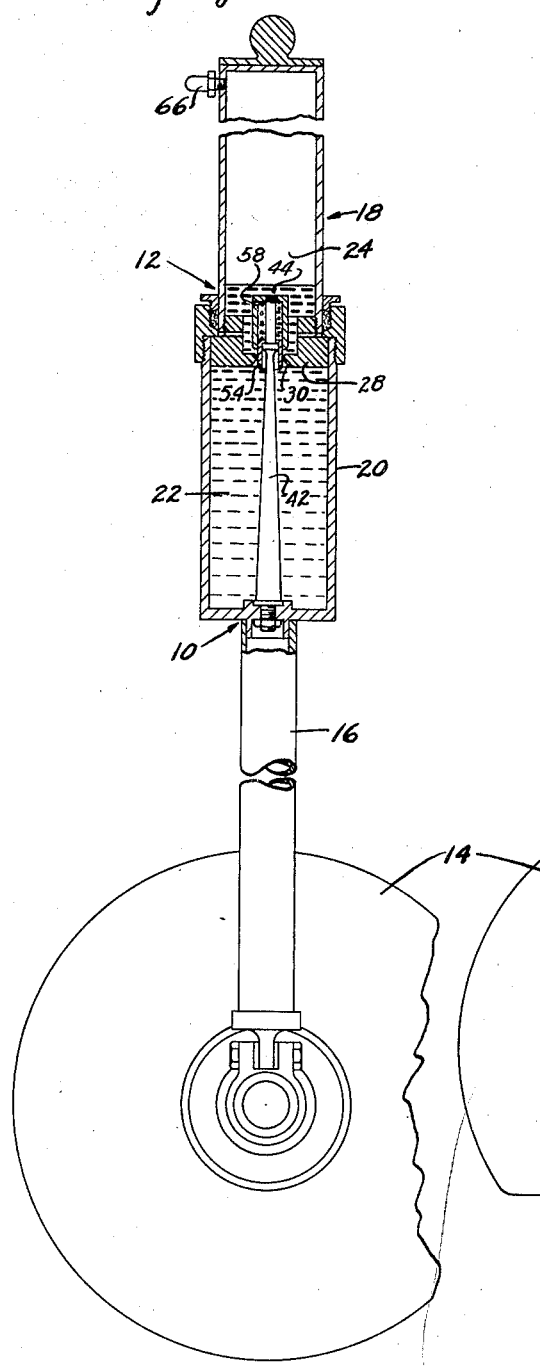
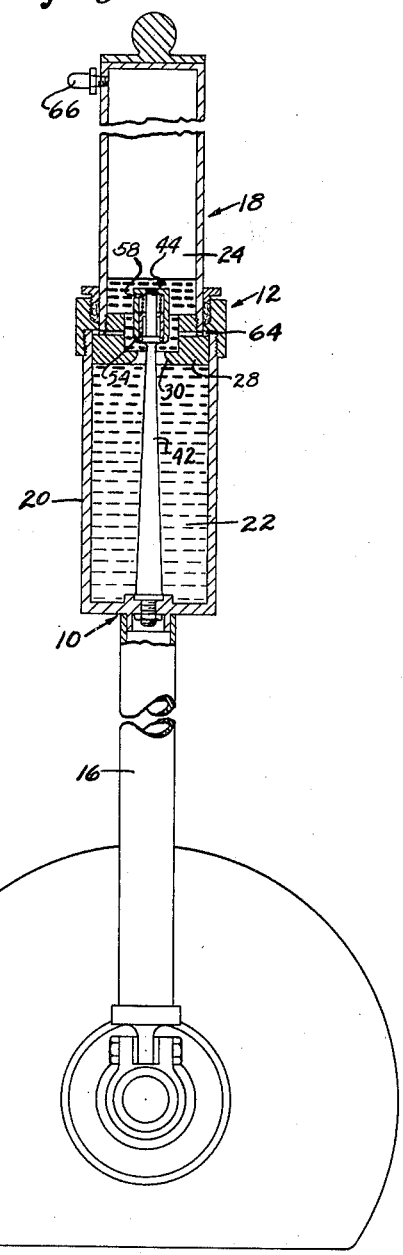
INVENTOR
MAX ISAACSON
BY
ATTORNEYS Aug. 27, 1940.　　　　M. ISAACSON　　　　2,212,541
SHOCK ABSORBER
Filed Jan. 4, 1939　　　　3 Sheets-Sheet 2
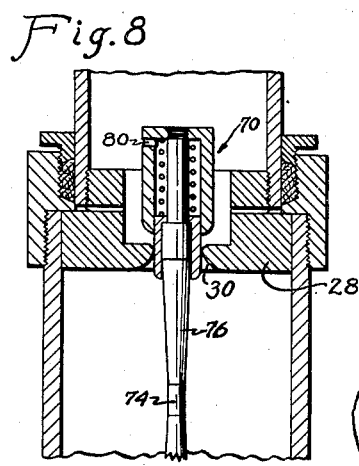
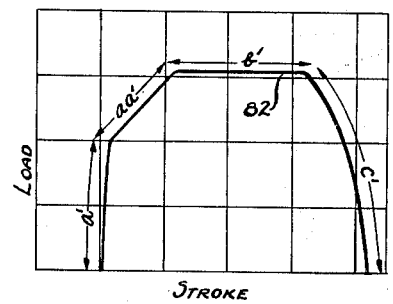
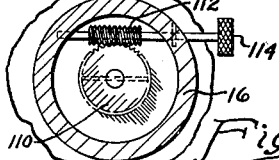
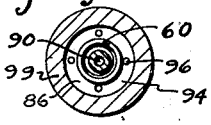
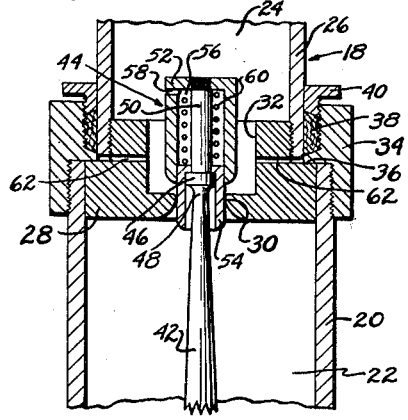
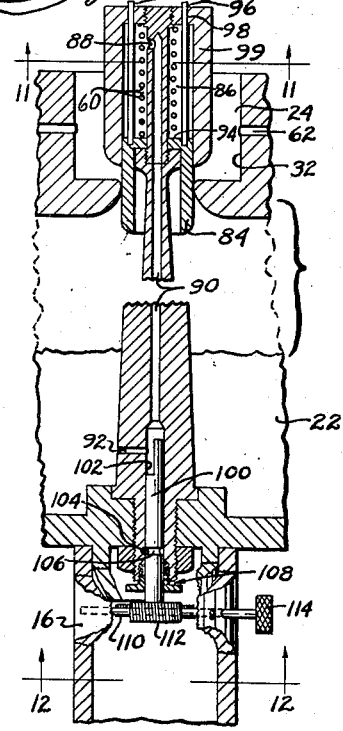
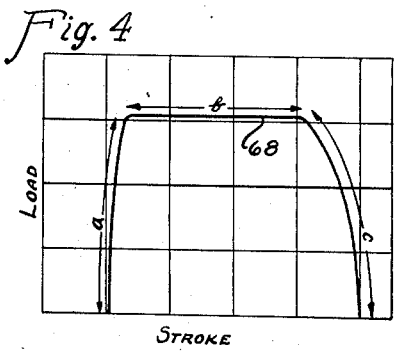
INVENTOR
MAX ISAACSON
ATTORNEYS

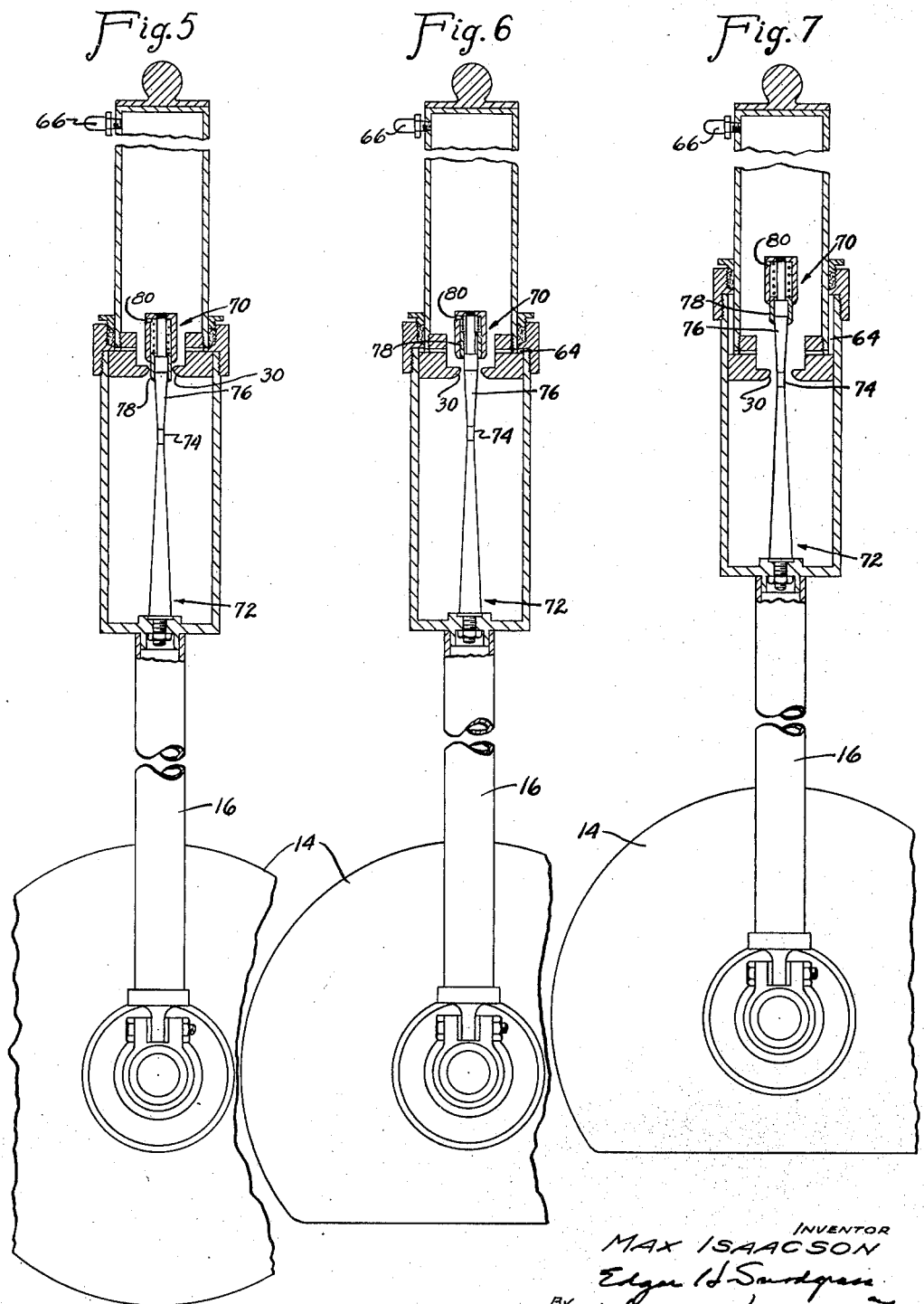

Patented Aug. 27, 1940

2,212,541

UNITED STATES PATENT OFFICE 2,212,541

SHOCK ABSORBER

Max Isaacson, Dayton, Ohio

Application January 4, 1939, Serial No. 249,264

19 Claims. (Cl. 267—64)

(Granted under the act of March 3, 1883, as amended April 30, 1928; 370 O. G. 757)

The invention described herein may be manufactured and used by or for the Government, for governmental purposes, without the payment to me of any royalty thereon.

This invention relates to shock absorbers and particularly to hydraulic shock absorbers having a metering pin, for use in connection with a resilient suspension medium and is especially useful in connection with landing gears for airplanes and other aircraft.

The primary object of my invention is to provide a novel shock absorber having a main orifice therein and an improved metering pin cooperating with said orifice to control the flow of fluid through said orifice.

Another object of my invention is to provide in an hydraulic shock absorber of the type in which a main orifice is controlled by a metering pin, means carried by said metering pin and movable relative thereto for opening and closing said orifice, said means being so constructed and arranged to control said orifice as a function of the rate of application of pressure difference between said elements and substantially in accordance with a predetermined time load curve characteristic.

It is another object of my invention to provide in a shock absorber having a main orifice therein, a novel metering pin having means carried by said metering pin and movable relative thereto for closing said orifice when the shock absorber elements are in the fully extended position to thereby build up a load less than but in predetermined ratio relation to a maximum load not greater than the maximum allowable load, said metering pin thereafter establishing communication through said orifice and regulating the same in a manner to increase said load to said maximum load during an initial portion of the stroke and to thereafter maintain said load not in excess of the maximum for a major portion of the stroke.

It is a further object of my invention to provide in an oleo shock absorber pressure differential valve means carried by the metering pin operative in response to the rate of application of pressure and in accordance with a predetermined time deflection characteristic for controlling a main orifice opening and adjustable means for varying the said time deflection curve characteristic in accordance with a predetermined time load curve characteristic.

It is a further object of my invention to provide a novel metering pin for a shock absorber of the character described having a casing secured thereto and a pressure differential responsive piston mounted in said casing forming a chamber therewith.

It is a still further object of my invention to provide for a shock absorber of the character described the aforesaid novel metering pin with restricted passage therein, and means for varying said restriction.

Other objects and advantages of my invention will be apparent from the following description and accompanying drawings, wherein like reference characters refer to like parts throughout the several views:

Fig. 1 is a vertical side elevational view of an oleo leg and tire arrangement embodying my invention, showing the same in fully extended position with parts broken away and in section;

Fig. 2 is a similar view showing the shock absorber and tire at the stage in which the tire has just been fully deflected;

Fig. 3 is an enlarged detail view of the metering pin and associated parts of the shock absorber illustrated in Fig. 1;

Fig. 4 is a graphical diagram showing the operation of the shock absorber shown in Figs. 1 to 3;

Figs. 5, 6 and 7 are views similar to Figs. 1 and 2, showing three consecutive stages of operation of a further embodiment of my invention;

Fig. 8 is an enlarged detail view of the metering pin and associated parts of the shock absorber as illustrated in Fig. 5;

Fig. 9 is a graphical diagram showing the operation of the shock absorber shown in Figs. 5 to 8;

Fig. 10 is a sectioned fractional view showing a variation of my invention;

Fig. 11 is a section view taken on the line 11—11 of Fig. 10; and

Fig. 12 is a section view taken on the line 12—12 of Fig. 10.

Referring to the drawings, the oleo leg 10, shown in Figs. 1 and 2 as illustrated, constitutes a strut of a conventional landing gear, including a shock absorber 12 that is connected, at its lower end to a landing wheel 14 through an extension rod 16, and adapted to be connected at its upper end, to the airplane wing or fuselage by a suitable connection such as a ball and socket connection. The shock absorber 12 includes a piston-cylinder 18 and cylinder 20 that are telescopically arranged to be collapsed and extended. The lower cylinder 20 constitutes a working chamber 22 and the piston-cylinder 18 forms a reservoir chamber 24, the two chambers being adapted for communication therebetween.

As best seen in Fig. 3, the piston-cylinder 18 comprises a cylinder 26 and a piston head 28 having, as illustrated, an orifice 30 centrally positioned therein. The piston head is formed with a central recess 32 in the upper face thereof, and concentric with the orifice 30. The piston-cylinder 18 is restrained in the cylinder 20 by means of a collar nut 34 having an inwardly protruding flange 36 to make peripheral contact with the cylinder 26, and the joint so made is further sealed against leakage by a suitable packing 38 and a packing nut 40. The piston head 28 is therefore seen to be slidable with respect to the cylinder 20, and the cylinder 26 is slidable with respect to the flange 34, packing 38, and packing nut 40, thereby permitting the collapsing of the piston-cylinder 18 within the cylinder 20 and the subsequent extension of the two cylinders.

Adapted to register with the orifice 30 is a contoured metering pin 42 fixedly secured centrally of the bottom of cylinder 20 and extending through the orifice 30. It will be observed that, as the cylinder 18 moves downwardly in the cylinder 20, the metering pin 42 moves relatively upward through the orifice 30. The orifice 30 in the piston head 28 is preferably formed with rounded edges or streamlined to effect a laminar flow of fluid therethrough and thereby prevent a foaming of the liquid during transfer therethrough. Said orifice is of such diameter and the contour of the metering pin 42 of such size and shape that they cooperate to provide a varying orifice area throughout the stroke, the variations of said orifice area being predetermined with respect to the load desired in relation to the stroke. The orifice 30 is normally closed by a valve means 44 in the nature of an auxiliary or pilot shock absorber of the fluid displacement type mounted on the pin and described in the next succeeding paragraph.

The metering pin 42 is provided with an abutment 46 near the upper end of said pin immediately adjoining the portion 48 of the pin of smallest diameter, and a guide portion 50 extending from said abutment substantially to the upper end of the pin. Secured to the pin in threaded engagement and spaced relation therewith is a casing or container 52 in which is disposed a piston sleeve valve 54 mounted in sliding engagement on the guide portion 50, forming with the casing 52 a liquid receiving chamber 56. The sleeve valve 54 is designed and disposed so as to normally close the orifice 30 when the shock absorber displaceable elements are fully extended, and adapted to reciprocate between said closed position as shown in Fig. 1 and an open position, as shown in Fig. 2. To enable the movement of the piston 54 from the closed position to the open position, and to obtain work from said piston, there is provided at the top of the casing 52 a metering orifice 58 through which the fluid normally fills and exhausts from the chamber.

While gravity would normally serve to move the valve sleeve 54 into closed position, in order to insure such closing, a spring 60 is interposed between the sleeve and the top of the casing. This spring will offer very little or negligible resistance to the movement of the sleeve in the opening thereof.

The piston head 28 is provided with conduits 62 connecting the reservoir chamber 24 with the space 64 (shown in Figs. 2, 6 and 7) formed between the cylinder walls when the cylinders are collapsed, in order to vent the said space. The piston cylinder 18 is provided with a filler plug 66 by means of which the shock absorber liquid may be introduced normally to a level above the piston when the cylinders are in the extended position, and through which may also be introduced compressed gas, if it is desired.

The operation of this device is as follows: In Fig. 1 the shock absorber unit is shown fully extended and ready for operation on contact with the ground. The tire is in the non-deflected condition and the piston sleeve valve 54 lies within the orifice 30, closing the same. When contact is established between the tire and the ground, hydraulic pressure builds up in the working chamber 22, which causes the piston sleeve valve to move from its closed position towards the open position, forcing the fluid contained in the chamber 56 into the reservoir chamber 24 through the restricted metering orifice 58. In Fig. 2 the tire is fully deflected and the piston sleeve valve 54 has moved into its compressed or open position, thereby opening the orifice 30 and permitting the flow of fluid therethrough.

It is to be observed that the communication between the chambers 22 and 24 is controlled by the piston sleeve valve 54, which is actuated as a function of the pressure difference between the pressures in the two chambers and of the size of metering orifice 58. Therefore, it will be seen that for a given size metering orifice the actuation of the piston sleeve valve depends on the rate of application of pressure in the chamber 22, and without regard to any predetermined pressure differential between the chambers, so that for a small pressure or load, the time of opening is relatively long; for a large pressure or load, the time of opening is relatively short. It is thereby seen that the rate of opening is adapted to be regulated in conformance with the same forces that operate on the tire and is made such that the duration of operation of the valve from closed to open positions corresponds with the time deflection characteristic of the tire so that the transfer of fluid from chamber 22 to chamber 24 will be delayed until the tire has been deflected to its maximum for any load. In this manner a maximum load on the shock absorber is reached with a relatively small consumption of stroke. It will be appreciated that different conditions of landing will produce different maximum loadings within the range of the maximum allowable load for which the shock absorber and tire is designed.

Following the stage in the operation shown in Fig. 2, the piston cylinder 18 will complete its downstroke while the fluid is being transferred through the orifice 30, being restricted in its transfer therethrough by means of the contoured shape of the metering pin so as to vary the effective cross-sectional area of the orifice and the resulting hydraulic resistance for the remainder of the stroke. This varying orifice area is predetermined throughout the stroke with respect to the changing velocity of the mass whose kinetic energy is being absorbed, and is such that, for a major portion of the stroke, a substantially constant load is obtained. As the piston nears the completion of its downward stroke, the effective cross-sectional area of the orifice, as determined by the relative position of the pin, is so designed that the energy absorbed in the tire during its initial deflection will be dissipated by the hydraulic resistance of the varying orifice in the last portion of the stroke and the tire will assume its normal shape under the normal static load of the craft.

The shock absorber strut, in the absence of a substantial amount of compressed gas in the reservoir chamber 24 or the use of some expansion means having a capacity at least equal to the weight of the airplane, will remain in a collapsed position when the airplane is at rest on the ground. Upon taking off of the aircraft, the shock absorber strut will again assume the extended position shown in Fig. 1 in response to the action of gravity.

It is a common expedient to place the liquid in the shock absorber under an initial pressure or load substantially equal to the load of the aircraft under static conditions as by means of compressed gas within the reservoir chamber. In such case the design of the differential valve and the metering pin is varied to correlate with the initial pressure or load on the shock absorber so as to produce similar results to those described above. However, the pressure at the end of the shock absorbing stroke will cause the shock absorber elements to be relatively displaced in the opposite direction until the gas pressure is in equilibrium with the static load of the craft, at which position the buoyancy provided by the compressed gas is utilized to provide resiliency in taxiing. It is also well-known that coil springs have been utilized in shock absorbers of this character for purposes of taxiing, and such may be utilized if desired, with my invention.

To illustrate the operation of my invention graphically, there is shown in Fig. 4 a curve 68 representing the hydraulic resistance developed by the shock absorber. The portion a of the curve represents an abruptly increasing load corresponding to the load built up during the time that communication between the chambers 22 and 24 is prevented, which occurs during the progress of the displaceable elements from the stage shown in Fig. 1 to that in Fig. 2, and which is the period when the tire is being deflected to maximum; the portion b represents a constant load obtaining throughout a major portion of the stroke while the tire is maintained at its maximum deflection; the portion c represents the decrease in the resistance load to zero value, which corresponds to the part of the stroke during which the energy absorbed by the tire is dissipated.

Figs. 5 to 8 show a further embodiment of my invention. In this embodiment the metering pin and the pressure differential valve mechanism are designed to produce an increasing resistance, a constant resistance and a decreasing resistance in a manner similar to that produced by the pin described above, except that the load developed by the valve mechanism 70 in controlling the orifice area is less than the load developed by the valve mechanism 44 shown in Figures 1, 2 and 3, and except further that these different resistances are developed at different points along the stroke. It will be seen as illustrated by the curve shown in Figure 9 that the increasing resistance is more gradually developed as indicated by the position on the pin 72 of the portion 74 of minimum-cross section and the upper tapering portion 76. The valve mechanism 70 and the pin 72 in this embodiment are so designed as hereinafter described that the valve 78 opens before the maximum load discussed in connection with the embodiment shown in Figures 1 and 2 has been built up, and the effective area of orifice 30, as determined by the design of the portion 76 of the pin 72, while progressing through orifice 30 during collapsing of the shock absorber, is such that the said maximum load is not built up until the minimum cross section portion 72 of the pin comes into registry with the orifice. From this point on in the stroke, the design of the pin resembles that shown in connection with the pin used in the embodiment illustrated by Figures 1 and 2. The general construction of the differential valve mechanism 10 in this embodiment is the same as the construction of the valve shown in Figs. 1 to 3 inclusive, but the dimensions of the piston or of the orifice are varied so that the load developed by this valve is less than, but in predetermined ratio relation to, the maximum load developed by the pin.

It will be seen that since the relative load developed by the differential valve in this embodiment is less than that developed by the differential valve in Figs. 1 to 3, that the duration of operation from closed to open position of the piston valve 78 will be relatively less than the duration of operation of the valve 54. Restriction to motion of the piston sleeve 78 is reduced by providing the metering orifice 80 of slightly larger size than the orifice 58 in the preceding embodiment. It will be obvious that the effective pressure area of the sleeve, or the length of the stroke of the sleeve from closed to open position can also be varied for this purpose.

The operation of this embodiment of my invention is graphically illustrated in Fig. 9 wherein a curve 82 represents the hydraulic resistance developed by the shock absorber. The portion a' of the curve represents an abruptly increasing load for an initial portion of the stroke corresponding to the load built up during the time that communication between the chambers 22 and 24 is prevented, which occurs during the progress of the displaceable elements from the stage shown in Fig. 5 to that in Fig. 6; the portion aa' represents the increase in the resistance to its maximum for any given load and corresponds to the portion of the stroke from the position in Fig. 6 to that in Fig. 7 during the time that the deflection of the tire to its maximum is completed; the portion b' represents a load of constant value obtaining throughout a major portion of the stroke while the tire is maintained at its maximum deflection; the portion c' represents the decrease in the resistance load to zero value which corresponds to the part of the stroke during which the energy absorbed by the tire is dissipated. It will be seen that the curve in Fig. 9 is similar to the curve in Fig. 4, except for the variation in the initial portion, which is due directly to the provision of the metering pin with the tapered portion 76 and except for the increased length of the stroke. It will be obvious, from a comparison of the curves 68 and 82, that the embodiment shown in Figs. 5 to 8 will require a longer pin in order to produce the same amount of resistance load produced by the embodiment in Figs. 1 to 3, and that in this respect the embodiment using the metering pin 72 is less efficient.

Figs. 10, 11 and 12 show a variation of my invention for providing adjustment of the restricted metering orifice to adjust the duration of movement of the piston valve 84 from the closed to open position to correspond with the time deflection characteristic of different tires with which it may be employed, and to generally obtain a more sensitive adjustment. This variation may be utilized with either of my foregoing embodiments and is illustrated as being used with the embodiment shown in Figs. 1 to 3. In this variation the chamber 86 is illustrated as having direct communication with the working chamber 22 by means of a conduit formed in the pin, and as shown, is comprised of three intercommunicating bores, the portion 88 transverse to the pin at the top of the chamber 86, the portion 90 extending centrally of the pin, and the restricted portion 92 near the base of the pin, which serves as the metering orifice. Since the chamber 86 in this variation is in direct communication with the working chamber 22, differential pressure on the piston sleeve 84 is obtained by providing an area on the piston face 94 exposed to the chamber 86 less than the area on the opposite side initially and directly disposed in the working chamber 22, which is accomplished by means of guide pins 96 attached to the inner face 94 of the piston 84, said guide pins being received in close fitting slidable relation in apertures 98 located in the head of the casing 99 and having an effective area exposed in the reservoir chamber 24. It will be seen that while the effective areas on opposite sides of the piston valve 84 are equal, the effective area on the upper side 94 is divided into two portions, one of which is subject to the pressure in the reservoir chamber 24 and the other to the pressure in the working chamber 22 with the result that the combined effective pressure on that side is less than that on the lower side during the initial portion of the operating stroke of the shock absorber.

During the operation of upward movement of the valve 84, the displacement of liquid from chamber 86 to chamber 22 is permitted because of the slight enlargement of space in the chamber 22 occasioned by the simultaneous upward movement of valve 84 and the additional space made available thereby for the liquid flowing from chamber 86 before the piston orifice 30 is opened.

Adjustment of the metering orifice 92 is obtained by means of a segmental valve 100 rotatably mounted in a bore 102 in the bottom of the metering pin, said bore being in continuation of the bore 90 and intersecting with the restricted portion 92. The valve 100 is held in position by the engagement of a locking pin 104 in the annular groove 106 in the valve stem. Leakage past the valve stem is prevented by a suitable packing and nut 108. Adjustment of the valve externally of the shock absorber is provided by means of a gear 110 fixedly secured to the valve stem and the worm drive 112 mounted in the extension rod 16 and operable by means of the knurled knob 114. By rotating the valve, minute variations in the size of the restricted orifice 92 are obtained.

It is to be understood that my invention is not limited to the forms which are shown and described, but that various changes may be made without departing from the spirit thereof and the scope of the appended claims.

I claim:

1. In a shock absorber having two relatively movable elements forming two chambers and having an orifice therebetween through which fluid is transferred from one chamber to the other to dissipate energy, one of said elements being provided with the said orifice and the other of said elements being provided with a metering pin adapted to register with said orifice, means carried by said metering pin and movable relative thereto for opening and closing said orifice and hydraulic resistance means serving to control one of said opening and closing movements of said last mentioned means as a function of the rate of application of pressure difference between said elements and substantially in accordance with a predetermined time-load curve characteristic.

2. In a shock absorber having two relatively movable elements forming a working chamber and a reservoir chamber and having an orifice therebetween through which fluid is transferred from one chamber to the other to dissipate energy, one of said elements being provided with the said orifice and the other of said elements being provided with a metering pin adapted to register with said orifice, means carried by said metering pin and movable relative thereto for normally closing said orifice when said displaceable elements are in the fully extended position and hydraulic resistance means serving to control the movement of said last mentioned means as a function of the rate of application of pressure difference between said elements and substantially in accordance with a predetermined time-load curve characteristic to open said orifice when the load developed by the shock absorber is substantially at a maximum not in excess of the maximum allowable load.

3. In a shock absorber having two relatively movable elements and an orifice therebetween through which fluid is transferred by said elements to dissipate energy, one of said elements having a metering pin adapted to register with said orifice, hydraulic resistance controlled valve means carried by said metering pin and movable relative thereto, said valve means closing said orifice to thereby prevent the transfer of fluid through said orifice and being responsive when in the closed position to the rate of application of pressure difference between said elements and to said hydraulic resistance to open said orifice.

4. In a shock absorber having two relatively movable elements forming a working chamber and a reservoir chamber and having an orifice therebetween through which fluid is transferred from one chamber to the other to dissipate energy, one of said elements being provided with the said orifice and the other of said elements being provided with a metering pin adapted to register with said orifice, hydraulic resistance controlled means carried by said metering pin and movable relative thereto for opening and closing said orifice, said means being constructed and arranged to operate as a function of the rate of application of pressure difference between said elements and substantially in accordance with a predetermined time-load curve characteristic to open said orifice when the shock absorber has developed a load less than the maximum allowable.

5. In a shock absorber having two relatively movable elements and an orifice therebetween through which fluid is transferred by said elements to dissipate energy, one of said elements having a metering pin adapted to register with said orifice, hydraulic resistance controlled valve means carried by said metering pin and movable relative thereto, said valve means serving to prevent the flow of fluid through said orifice to thereby build up a load less than but in predetermined ratio relation to a maximum load that is not greater than the maximum allowable load and for thereafter establishing communication through said orifice, said metering pin serving to regulate said orifice to increase said load to said maximum and thereafter maintaining said load at a value not in excess of said maximum.

6. In a shock absorber having two relatively movable elements forming two chambers and having an orifice therebetween through which fluid is transferred from one chamber to the other to dissipate energy, one of said elements being provided with the said orifice and the other of said elements being provided with a metering pin adapted to register with said orifice, means carried by said metering pin and movable relative thereto for opening and closing said orifice, and hydraulic resistance means serving to control one of said opening and closing movements of said last mentioned means as a function of the rate of application of pressure difference between said elements and substantially in accordance with a predetermined time-load curve characteristic, and means for adjustably varying said means to thereby vary said characteristic.

7. In a shock absorber adapted for use in connection with a resilient suspension medium and having two relatively movable elements and an orifice therebetween through which fluid is transferred by said elements to dissipate energy, one of said elements having a metering pin adapted to register with said orifice, valve means carried by said metering pin and movable relative thereto for closing and opening said orifice and hydraulic resistance means for regulating the movement of said valve from closed to open position in response to the rate of application of pressure difference between said elements and substantially in accordance with the time-deflection curve characteristic of said suspension medium.

8. In a shock absorber adapted for use in connection with a resilient suspension medium and having two relatively movable elements and an orifice therebetween through which fluid is transferred by said elements to dissipate energy, one of said elements having a metering pin adapted to register with said orifice, hydraulic resistance controlled valve means carried by said metering pin and movable relative thereto, said valve means serving to prevent the flow of fluid through said orifice to thereby build up an abruptly increasing load not in excess of the maximum allowable for a relatively small displacement between said movable elements during the deflection of the suspension medium, and for thereafter establishing communication through said orifice in such a manner as to prevent further increase in load.

9. In a shock absorber adapted for use in connection with a resilient suspension medium and having two relatively movable elements and an orifice therebetween through which fluid is transferred by said elements to dissipate energy, one of said elements having a metering pin adapted to register with said orifice, hydraulic resistance controlled valve means carried by said metering pin and movable relative thereto, said valve means closing said orifice to thereby prevent the transfer of fluid through said orifice and being responsive, when in the closed position, to the rate of application of pressure difference between said elements and to said hydraulic resistance to open said orifice, said metering pin thereafter cooperating with said orifice to control the flow of fluid through said orifice during an initial portion of the stroke in such a manner as to build up a maximum load not in excess of the maximum allowable load in said shock absorber and for maintaining said load substantially constant during a major portion of the stroke.

10. In a shock absorber adapted for use in connection with a resilient suspension medium and having two relatively displaceable elements and an orifice therebetween through which fluid is transferred by said elements to dissipate energy, one of said elements having a metering pin adapted to register with said orifice, hydraulic resistance controlled valve means carried by said metering pin and movable relative thereto, said valve means serving to prevent the flow of fluid through said orifice to thereby build up a load less than but in predetermined ratio relation to a maximum load not greater than the maximum allowable load, and for thereafter establishing communication through said orifice, said metering pin varying thereafter the opening of said orifice to increase said load to said maximum during the initial portion of the displacement of said elements and to maintain the load at a value not in excess of said maximum during the remainder of said displacement.

11. In a shock absorber, a pair of relatively movable elements, one of said elements being provided with an orifice through which fluid is transferred to dissipate energy and the other of said elements being provided with a metering pin adapted to register with said orifice and having pressure differential means carried by said metering pin and movable relative thereto for controlling said orifice, said pressure differential means comprising a chamber, a restricted orifice and a piston movable in said chamber normally closing said first mentioned orifice, said piston being movable in response to the rate of application of pressure difference between said elements and to the flow resistance of said restricted orifice.

12. In a shock absorber, a pair of relatively movable elements, one of said elements being provided with an orifice through which fluid is transferred to dissipate energy and the other of said elements being provided with a metering pin adapted to register with said orifice and having pressure differential means carried by said metering pin and movable relative thereto for controlling said orifice, said pressure differential means comprising a chamber, a variable restricted orifice and a piston movable in said chamber normally closing said first mentioned orifice, said piston being movable in response to the rate of application of pressure difference between said elements and to the flow through said restricted orifice, and means for adjusting said variable restricted orifice.

13. In a shock absorber, a pair of relatively movable elements, one of said elements being provided with an orifice through which fluid is transferred to dissipate energy and the other of said elements being provided with a metering pin adapted to register with said orifice and having pressure differential means carried by said metering pin and movable relative thereto for controlling said orifice, said pressure differential means comprising a chamber, a restricted orifice and a piston movable in said chamber and between said metering pin and said first mentioned orifice to normally close same, said piston being movable as a function of the rate of application of pressure difference between said elements and the flow resistance of said restricted orifice.

14. In a shock absorber adapted for use in connection with a resilient suspension medium and having two relatively movable elements and an orifice therebetween through which fluid is transferred by said elements to dissipate energy, one of said elements having a metering pin adapted to register with said orifice, pressure differentially controlled valve means carried by said metering pin and movable relative thereto for controlling said orifice, said means comprising a chamber, a restricted orifice and a piston movable in said chamber normally closing said first mentioned orifice, said piston being movable as a function of the rate of application of pressure difference between said elements and the flow resistance of said restricted orifice.

15. In a shock absorber having two relatively movable elements forming two chambers and having an orifice therebetween through which fluid is transferred from one chamber to the other to dissipate energy, one of said elements being provided with the said orifice and the other of said elements being provided with a metering pin adapted to register with said orifice, an auxiliary shock absorber of the hydraulic resistance type mounted on said metering pin comprising relatively movable elements and cooperating with said orifice to absorb and dissipate energy during the initial portion of the stroke of said first-mentioned relatively movable elements.

16. A metering pin for an hydraulic shock absorber having displaceable elements and a metering orifice therebetween, said metering pin having mounted thereon a pilot hydraulic shock absorber having an element disposed within said orifice and movable relative to said metering pin in response to the shock absorbing displacements of said elements.

17. A metering pin for an hydraulic shock absorber of the type having two chambers and an orifice therebetween, said metering pin having a contoured body portion provided with an abutment at the upper end thereof and having a casing secured to the upper end of said pin above said abutment, said casing having a restricted orifice therein adapted for communication with one of said first mentioned two chambers, and a piston slidably mounted in said casing and forming with said casing a liquid receiving chamber, said piston being yieldingly urged to engage said abutment and cooperating with said pin in such position to normally close said first mentioned orifice and being adapted to open the same in response to a pressure difference between the first mentioned two chambers and to the flow resistance through said restricted orifice.

18. A metering pin for an hydraulic shock absorber of the type having two chambers and an orifice therebetween, said metering pin having a contoured body portion provided with an abutment at the upper end thereof and having a casing secured to the upper end of said pin above said abutment, a piston slidably mounted in said casing and forming with said casing a liquid receiving chamber, said pin having a restricted passage extending internally of said pin connecting said liquid receiving chamber with one of said first mentioned two chambers, said piston being yieldingly urged to engage said abutment and cooperating with said pin in such position to normally close said first mentioned orifice and being adapted to open the same in response to a pressure difference between the first mentioned two chambers and to the flow resistance through the restriction of said passage, and means for adjustably varying said restriction externally of the shock absorber.

19. In a shock absorber, a pair of relatively movable elements, one of said elements being provided with an orifice through which fluid is transferred to dissipate energy and the other of said elements being provided with a metering pin adapted to register with said orifice and having pressure differential means carried by said metering pin and movable relative thereto for controlling said orifice, said pressure differential means comprising two relative movable members providing a working chamber having a restricted orifice through which fluid is transferred to dissipate energy, one of said members serving to normally close said first mentioned orifice, said member being relatively displaceable to open said first mentioned orifice as a function of the rate of application of pressure difference between said elements and substantially in accordance with a predetermined time-load curve characteristic.

MAX ISAACSON.